United States Patent
Arnold

(10) Patent No.: US 7,113,000 B2
(45) Date of Patent: Sep. 26, 2006

(54) BUS AGENT HAVING MULTIPLE REFERENCE LEVELS

(75) Inventor: Barry J. Arnold, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 108 days.

(21) Appl. No.: 10/732,684

(22) Filed: Dec. 10, 2003

(65) Prior Publication Data

US 2005/0127938 A1 Jun. 16, 2005

(51) Int. Cl.
*H03K 19/0175* (2006.01)

(52) U.S. Cl. .......................................... 326/82; 326/26

(58) Field of Classification Search .................. 326/26, 326/27, 30, 82–90
See application file for complete search history.

(56) References Cited

U.S. PATENT DOCUMENTS

| | | | |
|---|---|---|---|
| 5,528,168 A * | 6/1996 | Kleveland | 326/30 |
| 5,856,755 A | 1/1999 | Falconer et al. | |
| 6,026,456 A * | 2/2000 | Ilkbahar | 710/100 |
| 6,249,142 B1 * | 6/2001 | Hall et al. | 326/30 |
| 6,300,789 B1 * | 10/2001 | Ball | 326/30 |
| 6,609,171 B1 | 8/2003 | Singh et al. | |

OTHER PUBLICATIONS

Ilkbahar, Alper et al., "Itanium Processor System Bus Design", IEEE Journal of Solid State Circuits vol. 36, No. 10, Oct. 2001, pp. 1565-1573.
Sledjeski, Lee, "Considerations for Bus Termination in Computing Systems", International IC '99 Conference Proceedings, 1999, pp. 223-228, no month.
Gabara, Thaddeus J., et al., "Forming Damped LRC Parasitic Circuits in Simultaneously Switched CMOS Output Buffers", IEEE Journal of Solid State Circuits, vol. 32, No. 3, Mar. 1997, pp. 407-418.

* cited by examiner

*Primary Examiner*—Don Le

(57) ABSTRACT

An integrated circuit is configured as a selected one of a terminated and a non-terminated bus agent for terminating a bus signal line. Reference level selection logic selects one of a first and a distinct second reference level as a selected level. The integrated circuit compares the bus signal line with the selected level to determine the state of the bus signal line.

25 Claims, 5 Drawing Sheets

BUS AGENT HAVING MULTIPLE REFERENCE LEVELS

BACKGROUND

Computer systems use one or more busses for communicating information between computer components. A processor, for example, communicates with memory, input/output devices, etc. through one or more busses that may comprise a bus hierarchy. The choice of bus architecture is determined by a number of considerations including active/inactive power consumption, ability to reconfigure components (e.g., add, move, remove components), support for multiple voltages, and signal termination.

These busses permit communication of data, address, and control signals between various bus agents. The bus architecture typically includes some feature to permit maintaining or transitioning individual lines to a pre-determined state so that the bus signal lines do not float to indeterminate levels. Floating bus lines can undesirably introduce noise onto the bus communications. In addition, floating bus lines can result in excessive or even destructive power consumption levels for some architectures.

Terminators are used to couple the bus line to a termination supply level. The terminator permits maintaining or moving the bus lines to determinate levels instead of floating. The terminator also serves to diminish reflections at the ends of the bus.

The bus agents should have the same "trip point" such that they identically interpret the state associated with a given bus level. Preferably the trip point is located at the center of the possible bus signal swing for integrity of the signal detection process. The trip point for each bus agent is typically set by voltage dividers or junction voltage drops relative to another supply level on that bus agent.

Although the bus is expected to be driven to one of the same two levels regardless of whether the bus agent is terminated or non-terminated, terminated and non-terminated bus agents experience different voltage drops which shifts the trip point for terminated bus agents relative to the trip point for non-terminated bus agents. The effective window of signal swing for which terminated and non-terminated bus agents properly interpret the bus state is thus narrowed as a result of the variation in trip points.

SUMMARY

In one embodiment, a method includes configuring a bus agent as a selected one of a terminated or a non-terminated bus agent for terminating a bus signal line. Reference level selection logic selects one of a first and a distinct second reference level as a selected level. The integrated circuit compares the bus signal line with the selected level to determine the state of the bus signal line.

In one embodiment, a method includes providing a plurality of bus agents. Each bus agent is coupled to a common bus signal line as one of a terminated or a non-terminated bus agent. First and second distinct reference levels are provided for determining the logic state of the signal line. Each terminated bus agent compares the signal line with the first reference level. Each non-terminated bus agent compares the signal line with the second reference level.

A bus agent apparatus includes an integrated circuit configurable as a selected one of a terminated or a non-terminated bus agent for terminating a bus signal line. The bus agent includes reference level selection logic for selecting one of a first and a distinct second reference level as a selected level. The integrated circuit compares the bus signal line with the selected level to determine a state of the bus signal line.

A computer system apparatus includes a bus having at least one signal line. The apparatus includes a plurality of bus agents each coupled to the signal line as one of a terminated or a non-terminated bus agent. Each terminated bus agent compares the signal line with a first reference level to determine a state of the signal line. Each non-terminated bus agent compares the signal line with a second reference level to determine the state of the signal line. The first and second reference levels are distinct.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
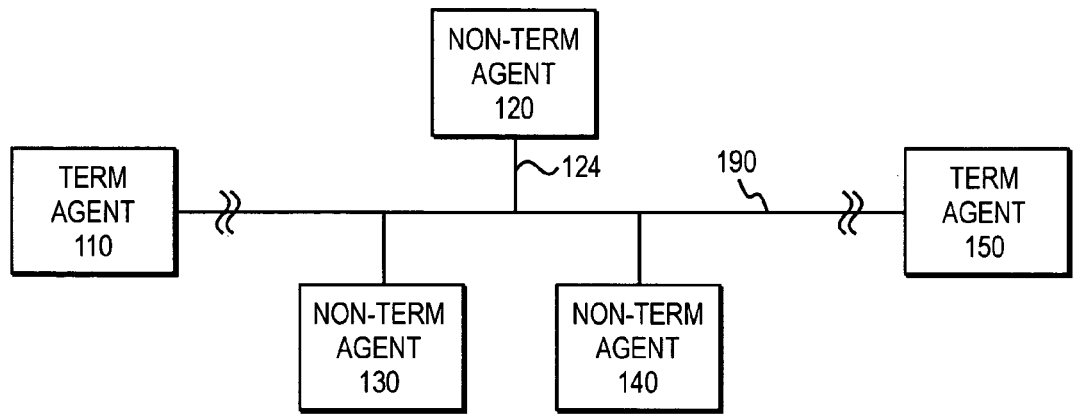
FIG. 1 illustrates a multi-drop bus with a plurality of bus agents configured as terminated or non-terminated bus agents.

FIG. 1 illustrates a computer system comprising a plurality (n) of bus agents 110–150 coupled by a common bus 190. The bus comprises one or more signal lines for communicating information among the bus agents. In one embodiment, the bus includes address, data, and control lines.

In one embodiment, a proper subset (m, m<n) of the bus agents are terminated bus agents and the remainder of the plurality of bus agents are non-terminated bus agents. In one embodiment, at least two bus agents of a plurality n of bus agents are terminated and the remaining n–2 bus agents are non-terminated.

Frequently terminators are used to terminate the ends of the bus. The number of terminators should be kept to a minimum in order to limit the, power consumption attributable to the terminators and to maintain the bus logic levels and the ability to pull-down or pull-up to those logic levels. In view of these constraints, the bus agents at the end of stubs 124 can be configured as non-terminated bus agents as long as the electrical length of the stubs is relatively short.

Termination of the bus agents 110, 150 at the ends of the bus eases maintaining or moving the bus lines to determinate voltage levels. Terminators at the ends of the bus also serve to diminish undesirable signal reflections such as those contributed by bus stubs. In one embodiment, at least one of the bus agents 110–150 is an integrated circuit. In one embodiment, the terminated integrated circuit bus agents have an on-die terminator. Computer systems frequently incorporate a multi-drop bus having a plurality of bus agents. Thus in one embodiment, at least one of the bus agents is a processor. Another bus agent may be, for example, a memory, wherein the processor is communicatively coupled to the memory through the bus.

Figure 2:
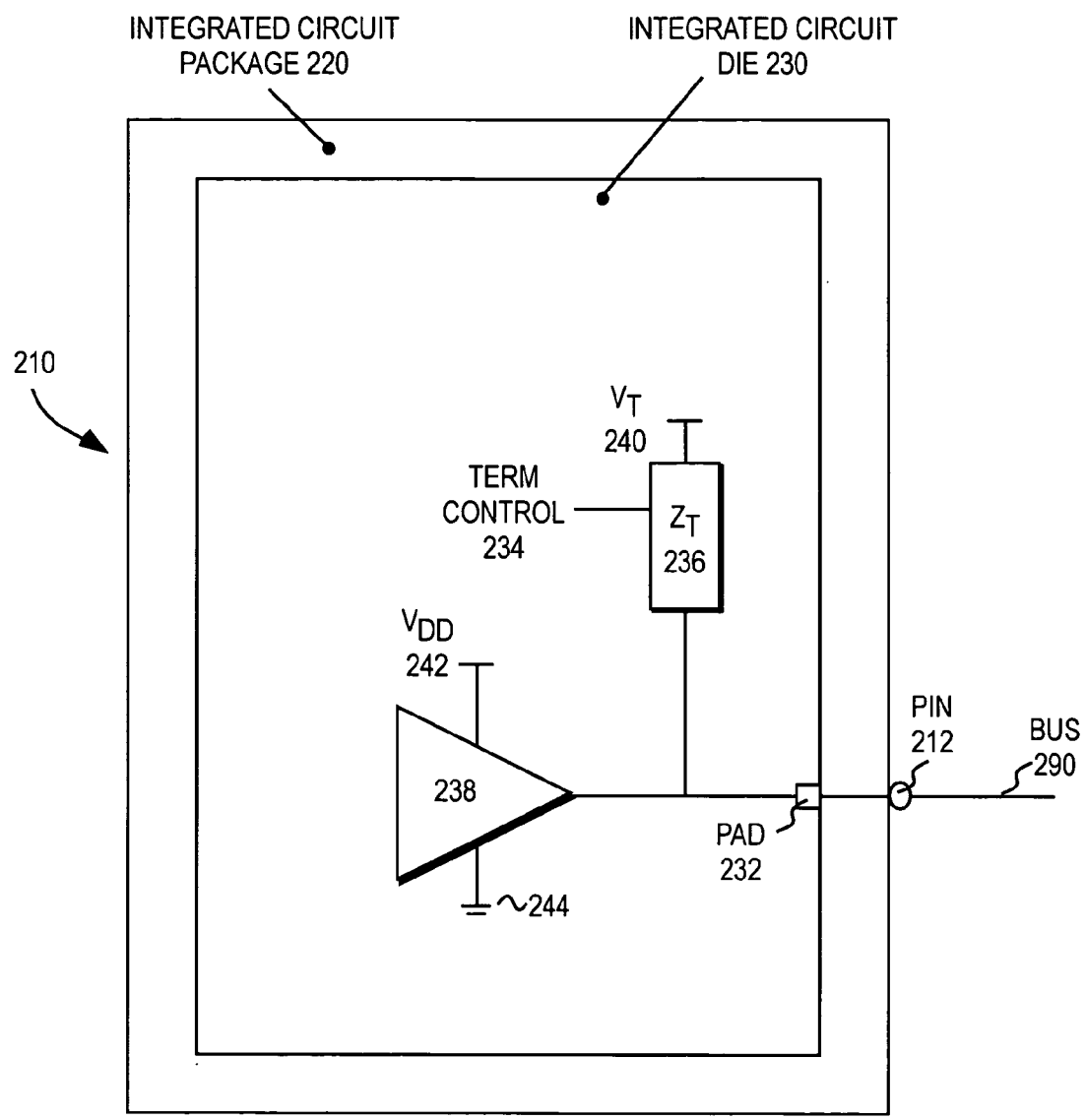
FIG. 2 illustrates one embodiment of a bus agent having a selectable termination impedance.

FIG. 2 illustrates one embodiment of a bus agent 210 with a selectable termination impedance 236. An integrated circuit driver 238 is coupled to a bus signal line 290. The driver is coupled to a pad 232 residing on an integrated circuit die 230 disposed within an integrated circuit package 220. Pad 232 is coupled to a driver pin 212 of the integrated circuit package. The pin is coupled to the bus signal line 290. Although a single signal line is illustrated, the bus may comprise a plurality of signal lines. Similar driver circuitry may be provided for each such signal line.

A termination impedance $Z_T$ 236 couples the bus signal line to a termination supply $V_T$ 240. The termination impedance is selected in accordance with termination control 234. In one embodiment, termination control 234 selectively couples the bus signal line 290 to the termination supply 240 through the termination impedance $Z_T$. Thus when the value of termination control 234 is chosen to couple the bus signal line 290 to the termination supply $V_T$ through termination impedance $Z_T$, the bus agent 210 is a terminated bus agent. When the value of termination control 234 is chosen to de-couple the path from the bus to the termination supply $V_T$ through termination impedance $Z_T$, the bus agent is a non-terminated bus agent.

Despite de-coupling the termination impedance, there may be other leakage paths (e.g., integrated circuit package) that couple the bus to another termination supply through a leakage impedance. This leakage impedance, however, is typically much larger than $Z_T$ which dominates the effective termination impedance when the termination and leakage impedances are in parallel. $Z_T$ is selected to match the nominal characteristic impedance of the bus. In one embodiment, the characteristic impedance of the bus is in a range of 40–50Ω with a nominal impedance of 45Ω. In one embodiment, $Z_T$ has a value in a range of 40–60 Ω.

In one embodiment, $V_T$ is ground 244. In an alternative embodiment, $V_T$ is substantially the same as the output driver supply $V_{DD}$ 242. Faster switching may be accomplished when the bus is not required to switch between the full supply rails to represent different logic states. Accordingly, in one embodiment, the termination supply level is between $V_{DD}$ 242 and ground 244 such that $V_{DD} > V_T > 0$ for positive supply levels or $0 < V_T < V_{DD}$ for negative supply levels.

In order to determine the state of the bus signal line 290, the bus agent uses a pre-determined reference level. This reference level is derived from a supply level provided to the integrated circuit. In one embodiment, the reference level is derived from $V_{DD}$. For example, the reference level may be determined as a proportion of the supply level using a voltage divider. Alternatively, the reference level may be generated using the voltage drop across semiconductor junctions to effectively drop the supply level closer to ground.

The voltage drop or proportion is typically determined at the time of manufacture. The reference level is selected to ensure adequate noise and signal swing margins. As a result of the greater current drawn by terminated bus agents and the relationship of the reference levels to the resulting supply level available to the integrated circuit, the use of the same proportion or voltage drops can leave insufficient margins for one of the terminated or non-terminated bus agent.

Figure 3:
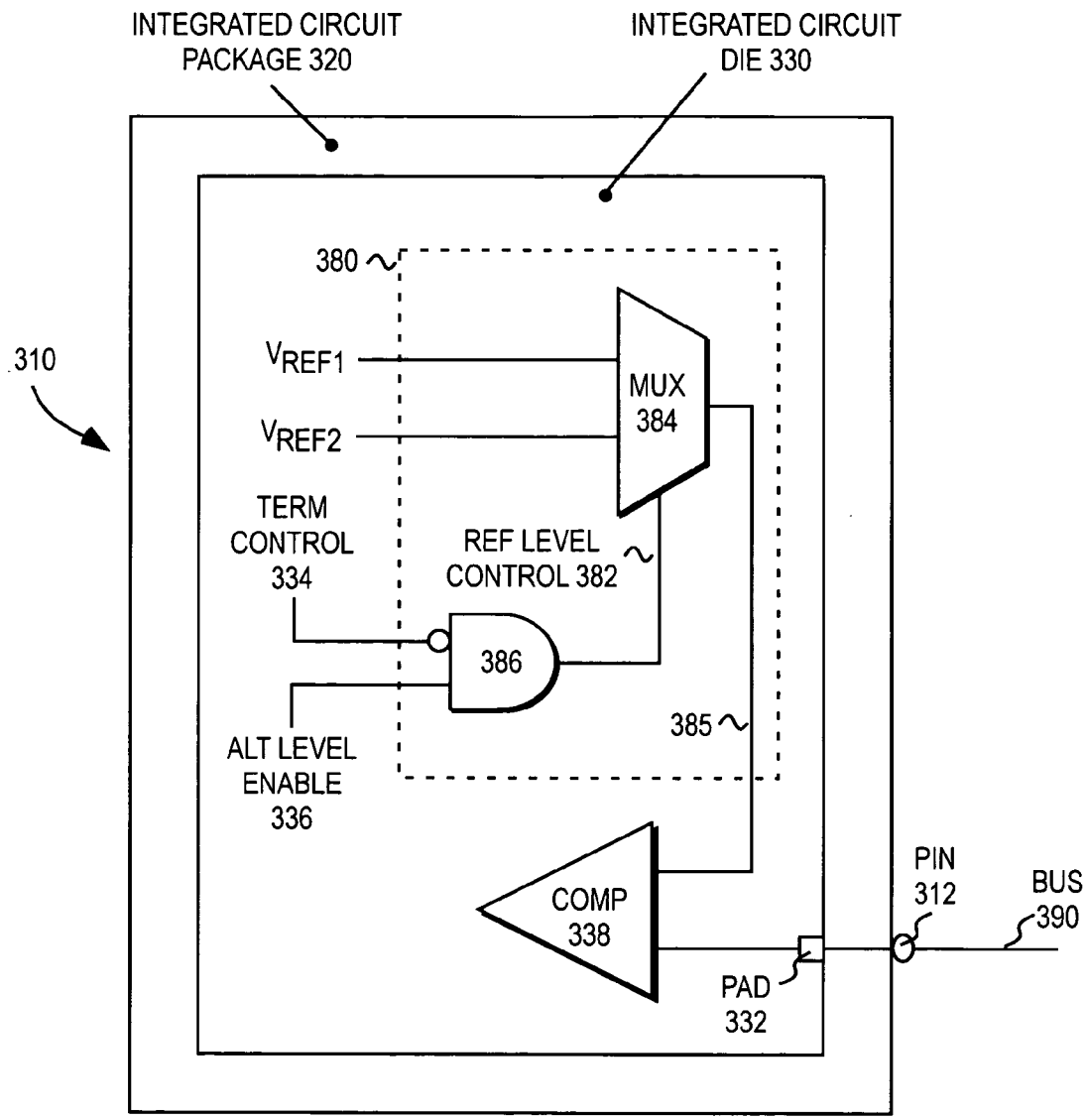
FIG. 3 illustrates one embodiment of a bus agent having a plurality of selectable reference levels for determining a bus signal line state.

FIG. 3 illustrates one embodiment of a bus agent 310 having multiple reference levels. A bus receiver (i.e., comparator 338) compares the bus signal line with a selected reference level to determine the state of the bus signal line. Comparator 338 is coupled to receiving pad 332 residing on an integrated circuit die 330 disposed within an integrated circuit package 320. Pad 332 is coupled to pin 312 of the integrated circuit package. The pin is coupled to bus signal line 390. Although a single signal line is illustrated, the bus may comprise a plurality of signal lines. Similar receiver circuitry may be provided for each such signal line.

Although the terminating impedance of FIG. 2 is illustrated in conjunction with driver (i.e., transmitter) circuitry, the terminating impedance may alternatively be coupled to the receiving pad 332. In one embodiment, the termination impedance 236, driver 238, and comparator 338 may be coupled to the same pad 232/332 to support a bi-directional bus 290/390.

Referring to FIG. 3, the selected reference level 385 is an analog value. $V_{REF1}$ and $V_{REF2}$ correspond to reference levels to be selected by multiplexer 384. In one embodiment, $V_{REF1}$ and $V_{REF2}$ are analog reference levels. The reference levels may be derived from a supply level provided to the integrated circuit. For example, a voltage divider may be used to derive the reference levels from a supply level.

The proportions of the voltage divider may be determined by design and thus fixed at time of manufacture by design. In one embodiment, the voltage divider proportion is determined by a fused resistive network. The reference levels are "tuned" after fabrication of the integrated circuit by selectively destroying fuses to select the appropriate levels for $V_{REF1}$ and $V_{REF2}$ subsequent to manufacture. Thus $V_{REF1}$ and $V_{REF2}$ are analog values corresponding to different proportions of the supply level in one embodiment.

In an alternative embodiment, $V_{REF1}$ and $V_{REF2}$ are digital values that correspond to different proportions of the supply level. If $V_{REF1}$ and $V_{REF2}$ are digital values, multiplexer 384 includes circuitry to convert the selected one of the $V_{REF1}$ and $V_{REF2}$ digital values into a corresponding analog selected reference level 385. In one embodiment, the digital values for $V_{REF1}$ and $V_{REF2}$ are set by selectively destroying fuses to select the appropriate values for $V_{REF1}$ and $V_{REF2}$ subsequent to manufacture.

Reference level selection logic 380 includes combinatorial logic 386 and multiplexer 384. Multiplexer 384 provides a reference level 385 corresponding to a selected one of $V_{REF1}$ or $V_{REF2}$ in accordance with reference level control 382. The selected reference level is provided to comparator 338.

In the illustrated embodiment, reference level control 382 is derived from termination control 334 and other logic signals (alternative level enable 336). In an alternative embodiment, reference level control 382 is directly derived from termination control 334 independently of any other logic signals. (i.e., REF LEVEL CONTROL=TERM CONTROL, or REF LEVEL CONTROL=TERMCONTROL).

In the illustrated embodiment, alternative level enable 336 is provided to permit disabling or enabling the ability to select different reference levels based on termination status of the bus agent. Assuming this feature is enabled (or omitted), reference level selection is a function of the termination state (i.e., terminated, non-terminated) indicated by termination control 334.

$V_{REF1}$ and $V_{REF2}$ represent distinct reference levels. Thus the receiver circuitry (comparator 338) can use one reference level when the bus agent is configured as a terminated bus agent and a different reference level when the bus agent is configured as a non-terminated bus agent. Given that the reference levels themselves vary depending upon the termination configuration of the bus agent, another viewpoint is that the multiplexer permits the comparator to use a different proportion of the state dependent supply voltage for determining a state of the bus.

The output of multiplexer 384 can be shared with a plurality of receivers. The use of multiple reference levels or reference levels derived from different proportions of the supply level depending upon termination configuration permits the bus agents to maintain substantially the same "trip point" relative to the bus signal swing even if the reference levels have different values for different bus agents.

Figure 4:
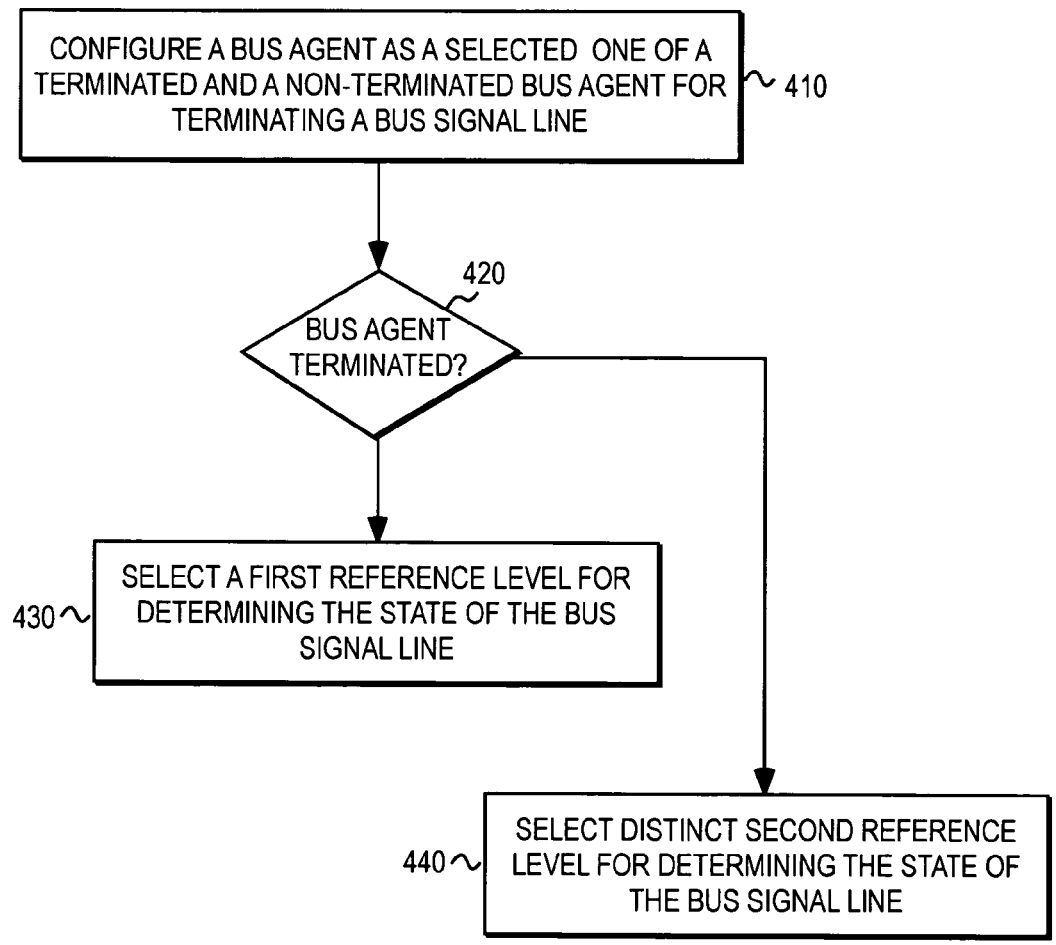
FIG. 4 illustrates a method of configuring a bus agent.

FIG. 4 illustrates one embodiment of a method for configuring a bus agent. In step 410, the bus agent is configured as a selected one of a terminated and a non-terminated bus agent for terminating a bus signal line. In one embodiment, the bus agent is an integrated circuit.

If the bus agent is terminated as determined in step 420, a first reference level is selected for determining the state of the bus signal line in step 430. If the bus agent is non-terminated, a distinct second reference level is selected for determining the state of the bus signal line in step 440.

Figure 5:
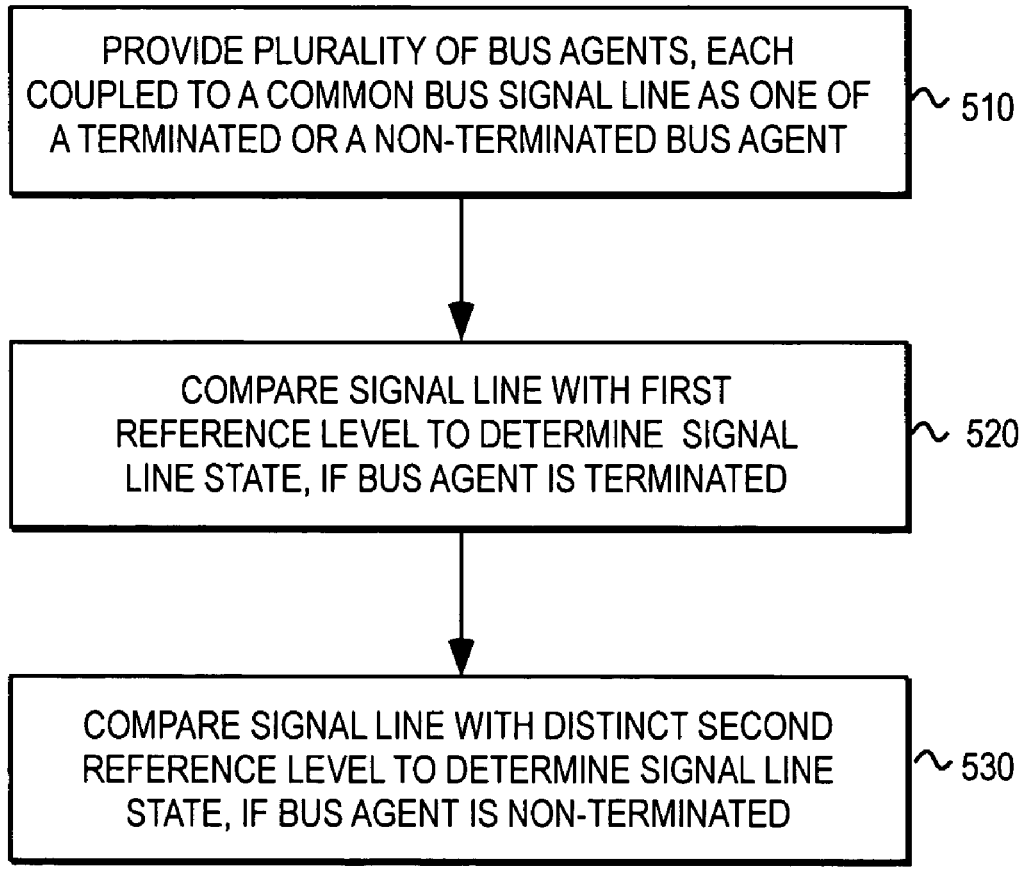
FIG. 5 illustrates a method of configuring a plurality of bus agents.

FIG. 5 illustrates a method of configuring a plurality of bus agents. A computer system apparatus having a multidrop bus, for example, may include a plurality of bus agents.

A plurality of bus agents is provided in step 510. Each bus agent is coupled to a common bus signal line as one of a terminated or a non-terminated bus agent. Each bus agent compares the bus signal line with a selected one of a plurality of reference levels determined in accordance with the bus agent's termination configuration. In particular, a given bus agent compares the signal line with a first reference level to determine the signal line state, if the bus agent is terminated as indicated in step 520. The given bus agent compares the signal line with a distinct second reference level to determine the signal line state in step 530, if the bus agent is non-terminated. The use of distinct reference levels permits accommodation for the consequential effects of having the flexibility to configure the bus agent as either a terminated or a non-terminated agent.

A bus agent apparatus configurable as a selected one of a terminated and a non-terminated bus agent for terminating a bus signal line is disclosed. In the illustrated embodiments of FIGS. 2–3, the bus agent is an integrated circuit. The bus agent includes reference level selection logic for selecting one of a first and a distinct second reference level as a selected level. The integrated circuit compares the bus signal line with the selected level to determine a state of the bus signal line.

In one embodiment, the integrated circuits of FIGS. 2–3 are fabricated as metal oxide semiconductor field effect transistor (MOSFET) integrated circuits. Thus, for example, the termination impedance may be a p-channel MOSFET in a positive supply logic architecture.

Various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising:
   configuring a bus agent as a selected one of a terminated and a non-terminated bus agent for terminating a bus signal line;
   selecting a first reference level for determining a state of the bus signal line when the bus agent is configured as the terminated bus agent; and
   selecting a second reference level for determining the state of the bus signal line when the bus agent is configured as the non-terminated bus agent, wherein the first and second reference levels are distinct reference levels.

2. The method of claim 1 wherein the bus agent selectively couples the bus signal line to a termination supply through a termination impedance in accordance with the selected configuration.

3. The method of claim 2 wherein the bus agent is an integrated circuit, wherein the termination impedance resides within a same integrated circuit package as the integrated circuit.

4. The method of claim 2 wherein the termination supply is ground.

5. The method of claim 2 wherein the termination supply is a value other than ground.

6. The method of claim 1 wherein the bus agent is an integrated circuit, wherein the integrated circuit is a metal oxide semiconductor field effect transistor (MOSFET) integrated circuit.

7. A method comprising:
   providing a plurality of bus agents each coupled to a common bus signal line as one of a terminated and a non-terminated bus agent; and
   providing first and second distinct reference levels for determining the logic state of the signal line, wherein each terminated bus agent compares the signal line with the first reference level, wherein each non-terminated bus agent compares the signal line with the second reference level.

8. The method of claim 7 wherein a proper subset of the plurality of bus agents is configured as terminated bus agents, wherein remaining bus agents of the plurality are configured as non-terminated bus agents.

9. The method of claim 7 wherein each terminated bus agent couples the bus signal line to a termination supply through a termination impedance.

10. The method of claim 9 wherein the termination supply is ground.

11. The method of claim 9 wherein the termination supply is a value other than ground.

12. The method of claim 9 wherein each bus agent is an integrated circuit, wherein the termination impedance and integrated circuit reside within a same integrated circuit package.

13. The method of claim 12 wherein the integrated circuit is a metal oxide semiconductor field effect transistor (MOSFET) integrated circuit.

14. The method of claim 7 wherein providing the plurality of bus agents further comprises selectively configuring each bus agent as one of the terminated and non-terminated bus agents in accordance with a termination control signal.

15. A bus agent apparatus comprising:
   an integrated circuit configurable as a selected one of a terminated and a non-terminated bus agent for terminating a bus signal line; and
   reference level selection logic for selecting one of a first and a distinct second reference level as a selected level in accordance with the selected integrated circuit configuration, wherein the integrated circuit compares the bus signal line with the selected level to determine a state of the bus signal line.

16. The apparatus of claim 15 wherein the integrated circuit couples the bus signal line to a termination supply through a termination impedance when configured as the terminated bus agent.

17. The apparatus of claim 16 wherein the termination impedance and the integrated circuit reside within a same integrated circuit package.

18. The apparatus of claim 16 wherein the termination impedance and the integrated circuit reside on a same integrated circuit die.

19. The apparatus of claim 15 wherein the selected level and the integrated circuit configuration are selected in accordance with a same termination control signal.

20. The apparatus of claim 15 wherein the integrated circuit is a metal oxide semiconductor field effect transistor (MOSFET) integrated circuit.

21. A computer system apparatus, comprising:
a bus having at least one signal line; and
a plurality of bus agents each coupled to the signal line as one of a terminated and a non-terminated bus agent, wherein each terminated bus agent compares the signal line with a first reference level to determine a state of the signal line, wherein each non-terminated bus agent compares the signal line with a second reference level to determine the state of the signal line, wherein the first and second reference levels are distinct.

22. The apparatus of claim 21 wherein each terminated bus agent couples the bus signal line to a termination supply through a termination impedance.

23. The apparatus of claim 22 wherein each bus agent comprises an integrated circuit, wherein the termination impedance and integrated circuit reside within a same integrated circuit package.

24. The apparatus of claim 23 wherein the termination impedance and the integrated circuit reside on a same integrated circuit die.

25. The apparatus of claim 23 wherein the integrated circuit is a metal oxide semiconductor field effect transistor (MOSFET) integrated circuit.

* * * * *

UNITED STATES PATENT AND TRADEMARK OFFICE
CERTIFICATE OF CORRECTION

PATENT NO.       : 7,113,000 B2  
APPLICATION NO.  : 10/732684  
DATED            : September 26, 2006  
INVENTOR(S)      : Barry J. Arnold Page 1 of 1

It is certified that error appears in the above-identified patent and that said Letters Patent is hereby corrected as shown below:

In column 3, line 40, delete "$0<V_T<V_{DD}$" and insert -- $0>V_T>V_{DD}$ --, therefor.

Signed and Sealed this

Thirtieth Day of December, 2008

JON W. DUDAS  
*Director of the United States Patent and Trademark Office*